July 4, 1933.  J. R. THORP  1,917,076
DEFLECTOR SHIELD
Filed Nov. 2, 1929
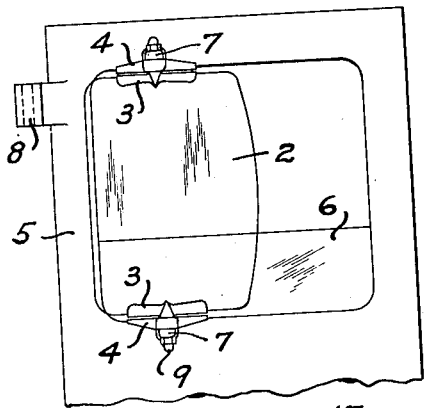
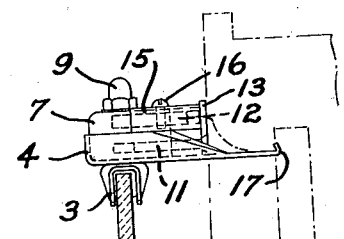
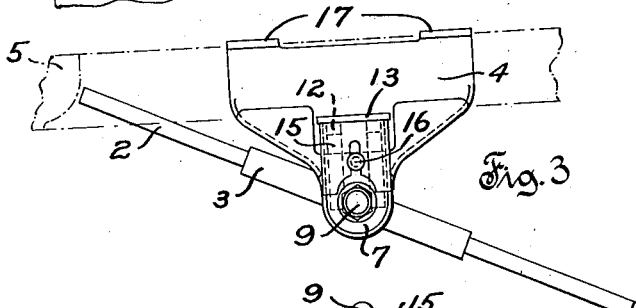
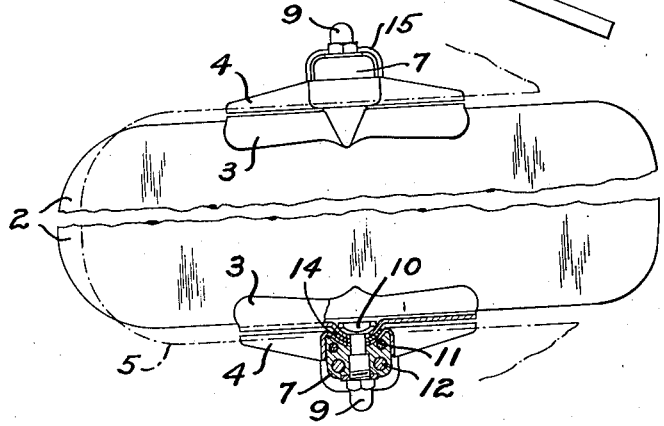
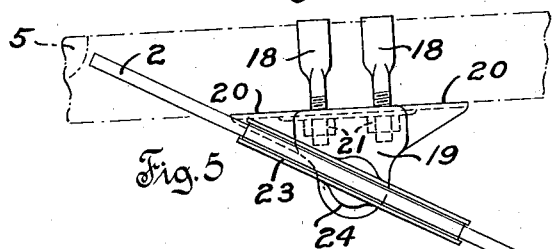
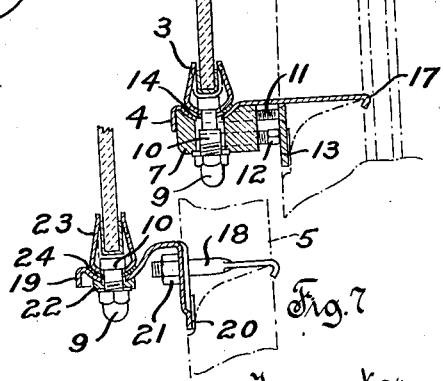
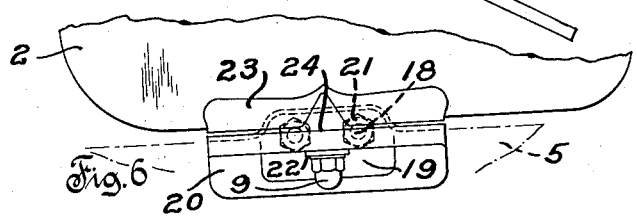
Inventor
J. R. Thorp
by W. H. Lieber
Attorney Patented July 4, 1933

1,917,076

UNITED STATES PATENT OFFICE

JOEL R. THORP, OF WEST ALLIS, WISCONSIN, ASSIGNOR, BY MESNE ASSIGNMENTS, TO THE FULTON COMPANY, OF WEST ALLIS, WISCONSIN, A CORPORATION OF WISCONSIN

DEFLECTOR SHIELD

Application filed November 2, 1929. Serial No. 404,260.

The present invention relates generally to improvements in the construction and operation of deflector shields for protecting the occupants of vehicles against drafts, rain, snow, hail, sleet, insects, dust, or the like.

An object of the invention is to provide an improved deflector shield structure, which is simple, compact and neat in construction, which is highly efficient in operation, and which may be conveniently and effectively associated with various types of vehicles so as to perform its intended function.

It has long been common practice in the automobile industry, to provide transparent deflector shields adjacent to the opposite ends of the windshield, for the purpose of preventing air currents and objects floating in the air, from striking the occupants of a vehicle while in motion. These prior shields are customarily formed for adjustment about vertical pivotal axes so as to permit setting thereof at various angles relative to the plane of the windshield. In open types of vehicles, the deflector shields are ordinarily mounted directly upon the wind-shield supporting frames, while in closed cars the front door frames may be more readily utilized as supports for the auxiliary shields.

It is a more specific object of the present invention to provide various improvements in the details of construction of auxiliary deflector shields of the type especially applicable to closed cars. In accordance with the improvement, a transparent deflector shield is pivotally supported upon vertically spaced brackets which are detachably associable with the frames of the front windows of a vehicle, in a more effective manner than has been possible with the prior art devices. The shield supports are formed so as to avoid excessive stress on the glass, and may be conveniently attached to window frames of various shapes.

The above and other inherent advantages of the improved structure will be apparent from the following detailed disclosure. A clear conception of several embodiments of the invention and of the mode of constructing, applying and of manipulating devices built in accordance therewith, may be had by referring to the drawing accompanying and forming a part of this specification in which like reference characters designate the same or similar parts in the various views.

Fig. 1 is a side elevation of a fragment of the front side door of an automobile, having one of the improved deflector shields applied thereto.

Fig. 2 is an enlarged part sectional rear end elevation of one type of the improved devices, showing the shield disposed parallel to the main window.

Fig. 3 is a top view of the deflector shield illustrated in Fig. 2, showing the shield set at an angle relative to the main window.

Fig. 4 is a fragmentary part sectional side elevation of the deflector shield of Figs. 2 and 3, showing the shield parallel to the main window.

Fig. 5 is a top view of a modified form of the improved devices, showing the shield set at an angle relative to the main window.

Fig. 6 is a fragmentary side elevation of the lower portion of the deflector shield illustrated in Fig. 5.

Fig. 7 is a fragmentary part sectional rear end view of the lower portion of the deflector shield illustrated in Figs. 5 and 6.

Referring specifically to Figs. 1 to 4 inclusive, the improved deflector shield shown therein, comprises in general a transparent shield 2 preferably formed of glass; a pivot element 3 rigidly attached to each of the opposite upper and lower ends of the shield 2; and a supporting bracket 4 pivotally associated with each of the elements 3.

The pivot elements 3 may be formed of sheet metal with the aid of dies, and are preferably of like construction. These elements may be rigidly attached to the glass shield 2 in any suitable manner as with cement, and are constructed so as to avoid necessity of notching the glass. The elements 3 have dished medial pivot portions provided with spherical zone surfaces as shown in Figs. 2 and 4.

The supporting brackets 4 may likewise be formed of sheet metal with the aid of dies, and are also preferably of like construction. The brackets 4 are provided at their outer medial portions with dished spherical zone surfaces which are cooperable with the adjacent similar surfaces of the elements 3 either direct or through intervening dished washers, to provide spherical zone pivot bearings 14, see Figs. 2 and 4. Each of the brackets 4 is also provided with a clamping block 7 adjoining the spherical zone portion thereof and provided with openings which are alined with through openings penetrating the pivot bearings 14. A clamping bolt 10 having its head disposed within the adjacent element 3, penetrates each set of these alined openings, and is provided at its protruding threaded end with a clamping nut 9. By adjusting the nuts 9, any desired degree of clamping between the elements 3 and the brackets 4, may be obtained at the spherical zone pivot bearings 14.

The inner portion of each bracket 4 is provided with a pair of spaced hooks 17 which are adapted to coact with the inner edge of a main frame 5 as shown in Figs. 2 and 3. A clamping plate 13 which is adjustably secured to the block 7 of each bracket 4 by means of one or more set screws 11, is cooperable with an outer surface of the main frame 5 midway between the hooks 17. Jack screws 12 carried by the blocks 7 are cooperable with the plates 13 remote from the set screws 11 in order to urge the plates 13 against the outer frame surfaces and to thereby maintain the hooks 17 in engagement with the inner frame surfaces.

As shown, the main frame 5 may be the frame of the front side door of a vehicle, this door being supported adjacent to the windshield of the vehicle by means of hinges 8. The opening in this front door may be provided with a vertically slidable glass window 6 as shown, which window may be adjusted without interference by the deflector shield. When the deflector shield is thus employed, it may be desirable to provide an adjustable cover plate 15 secured to the adjacent block 7 by means of a screw 16, for the purpose of concealing and protecting the jack screws 12 and the set screws 11 of the upper supporting bracket 4. This cover plate 15 is adjustable with the adjoining clamping plate 13, and may also be formed of sheet metal.

Referring specifically to Figs. 5 to 7 inclusive, the modified form of improved deflector shield shown therein is similar to that previously described and comprises in general a transparent shield 2 formed of glass or the like; a pivot element 23 rigidly secured to each of the opposite upper and lower ends of the shield 2; and a supporting bracket 19 pivotally associated with each of the elements 23.

The pivot elements 23 are quite similar in construction to the elements 3, and are preferably formed of sheet metal and attached to the shield 2 without necessity of notching the glass. The supporting brackets 19 are also preferably formed of sheet metal and coact with the adjacent elements 23 along spherical zone pivot bearings 24, see Fig. 7. The friction on the pivot bearings 24 is adjustable by virtue of clamping nuts 9 coacting with the bolts 10 and with reaction blocks 22 cooperating with the brackets 19 in an obvious manner.

The inner portion of each of the supporting brackets 19 is provided with a pair of spaced pads 20 which are adapted to coact with the outer surface of a main frame 5 as shown in Figs. 5 and 7. One or more hook bolts 18 are provided with hooked ends which are engageable with the inner edge of the main frame between the pads 20. The opposite threaded ends of the hook bolts 18 extend through openings in the bracket 19 and are provided with nuts 21 whereby the pads 20 and the hooked ends of the bolts 18 may be drawn toward each other to clamp the bracket 19 upon the intervening portion of the main frame 5.

The mode of attaching either type of the improved deflector shield will be clearly apparent from the foregoing description, and either of the devices may be readily applied by a novice without the use of tools other than a screw driver and pliers. The nuts 9 cooperating with the bolts 10, serve to produce any desired degree of frictional resistance at the spherical zone pivot bearings, and the shield 2 may be set at any desired angle relative to the plane of sliding of the window 6. When it is desired to prevent entry of draft through the open front windows of the forwardly moving vehicle, the shields 2 may be set as shown in Figs. 3 and 5 with their forward edges in close proximity to the front frames of the windows. If the shields 2 are to be utilized for the purpose of scooping air into the car enclosure when the vehicle is traveling in the forward direction, they may be swung about their pivotal axes so as to produce the desired effect. The deflector shields 2 do not interfere with sliding adjustment of the windows 6, and by virtue of the location of the pivots remote from the windows 6, the shields 2 do not interfere with cleaning of the outer surfaces of the windows 6 when closed.

The pivot elements may be readily constructed and attached to the glass shields 2, at minimum cost and without necessitating notching of the glass shield edges. This feature permits construction of the glass shields 2 at minimum cost and with least danger of breakage. The supporting brackets may also be readily constructed at minimum cost, and may be quickly adjusted for coaction with frames 5 of various shapes and thicknesses. The structures for laterally clamping the supporting brackets to the frames 5, eliminate stress on the glass shields 2 and avoid obstruction to the view of occupants of a vehicle having the improvement applied thereto. The upper and lower elements for supporting the shield 2 may be made alike in structure and hence interchangeable, thereby further reducing the manufacturing cost to a minimum. The metal elements of the structure may also be plated and polished to present a neat appearance, and the device may be applied and removed quickly and without marring the door or window frame. In the type of deflector shield disclosed in Figs. 2, 3 and 4, the supporting brackets 4 cover and conceal the clamping mechanisms from normal view, and the addition of the covers 15 also affords protection for the clamping elements of the upper support.

It should be understood that it is not desired to limit the present invention to the exact details of construction herein shown and described, for various modifications within the scope of the appended claims may occur to persons skilled in the art.

It is claimed and desired to secure by Letters Patent:—

1. In combination, a frame having an opening bounded by upper and lower reveals, a deflector shield having upper and lower coaxial vertical pivots disposed adjacent to said frame reveals, the forward and rear edges of said shield being swingable toward and away from said frame opening about the axis of said pivots, a supporting bracket extending laterally from each of said pivots toward the adjacent reveal, a connection between each of said brackets and the adjacent pivot formed to permit both rotation of the pivot about said axis and lateral angular displacement thereof relative to its supporting bracket about a point on said axis and each of said brackets having a clamping surface disposed remote from said axis and engageable with a side surface of the adjacent reveal, a plate cooperable with each of said brackets and having a clamping surface engageable with the opposite side surface of the adjacent reveal, and means for clamping the reveals between said surfaces.

2. In combination, a frame having an opening bounded by upper and lower reveals, a deflector shield having upper and lower coaxial substantially vertical pivots lying in the plane of said shield and disposed adjacent to said frame reveals, the forward and rear edges of said shield being swingable toward and away from said frame opening about the axis of said pivots, a supporting bracket extending laterally from each of said pivots toward the adjacent reveal, a connection between each of said brackets and the adjacent pivot formed to permit both rotation of the pivot about said axis and lateral angular displacement thereof relative to its supporting bracket and each of said brackets having a clamping surface remote from said axis and engageable with an inside surface of the adjacent reveal, a clamping element movable along each of said brackets and having a clamping surface engageable with the outside surface of the adjacent reveal, and means for moving said elements to clamp the reveals between said surfaces.

3. In combination, a frame having an opening bounded by upper and lower reveals, a deflector shield having upper and lower coaxial substantially vertical pivots lying in the plane of said shield and disposed adjacent to said frame reveals, the forward and rear edges of said shield being swingable toward and away from said frame opening about the axis of said pivots, a supporting bracket extending laterally from each of said pivots toward the adjacent reveal, a connection between each of said brackets and the adjacent pivot formed to permit both rotation of the pivot about said axis and lateral angular displacement thereof relative to its suporting bracket and each of said brackets having a clamping surface remote from said axis and engageable with an inside surface of the adjacent reveal, a clamping element slidably associated with each of said brackets between said axis and said clamping surface of the adjacent bracket, said elements being engageable with the outside surfaces of the adjacent reveals, and screw means journaled in said brackets for clamping the reveals between said bracket surfaces and said clamping elements.

4. In combination with a frame having an opening bounded by upper and lower reveals, a deflector shield having pivots projecting from the upper and lower edges thereof and disposed laterally adjacent to the upper and lower reveals of said opening, said shield being swingable with respect to said opening about said pivots, a supporting bracket extending laterally from each of said pivots toward the adjacent reveal, a connection between each of said brackets and the adjacent pivot comprising spherical bearing surfaces surrounding said pivots and formed to permit both rotation of the shield about the pivotal axes and lateral angular displacement thereof relative to said brackets, each of said brackets having a clamping surface engageable with a surface of the adjacent reveal, a clamping element movable relative to each of said brackets and having a clamping surface engageable with an opposite surface of the adjacent reveal, and means for moving said elements to clamp the reveals between said surfaces.

5. In combination with a frame having an opening bounded by upper and lower reveals, a deflector shield having substantially alined pivots lying in the plane of said shield and disposed laterally adjacent to the upper and lower reveals of said opening, said shield being swingable with respect to said opening about said pivots, a supporting bracket extending laterally from each of said pivots toward the adjacent reveal, a connection between each of said brackets and the adjacent pivot comprising spherical bearing surfaces surrounding said pivot and formed to permit both rotation of said shield about the pivotal axis and lateral angular displacement thereof relative to said brackets, each of said brackets having an integral clamping surface engageable with an inside surface of the adjacent reveal, a clamping element slidable along each of said brackets and having an integral clamping surface engageable with an outside surface of the adjacent reveal, and a clamping screw carried by each of said brackets for clamping the reveals between said surfaces.

In testimony whereof, the signature of the inventor is affixed hereto.

JOEL R. THORP.